(12) United States Patent
Uchida et al.

(10) Patent No.: US 11,145,865 B2
(45) Date of Patent: Oct. 12, 2021

(54) NONAQUEOUS ELECTROLYTE SECONDARY BATTERIES AND METHODS FOR PRODUCING THE SAME

(71) Applicant: SANYO Electric Co., Ltd., Daito (JP)

(72) Inventors: Naoki Uchida, Hyogo (JP); Ayumi Kochi, Osaka (JP); Haruya Nakai, Hyogo (JP)

(73) Assignee: SANYO Electric Co., Ltd., Daito (JP)

( * ) Notice: Subject to any disclaimer, the term of this patent is extended or adjusted under 35 U.S.C. 154(b) by 176 days.

(21) Appl. No.: 16/255,025

(22) Filed: Jan. 23, 2019

(65) Prior Publication Data

US 2019/0288287 A1   Sep. 19, 2019

(30) Foreign Application Priority Data

Mar. 15, 2018   (JP) .............................. JP2018-047969

(51) Int. Cl.
| | |
|---|---|
| *H01M 10/0525* | (2010.01) |
| *H01M 4/04* | (2006.01) |
| *H01M 4/587* | (2010.01) |
| *H01M 4/62* | (2006.01) |

(52) U.S. Cl.
CPC ........... *H01M 4/622* (2013.01); *H01M 4/043* (2013.01); *H01M 4/0404* (2013.01); *H01M 4/587* (2013.01); *H01M 10/0525* (2013.01)

(58) Field of Classification Search
CPC .. H01M 4/622; H01M 4/587; H01M 10/0525; H01M 4/043; H01M 4/0404; H01M 4/602; H01M 4/137; H01M 4/583; H01M 4/133; H01M 10/05; H01M 4/13; H01M 4/667; H01M 4/0419; Y02E 60/10
See application file for complete search history.

(56) References Cited

U.S. PATENT DOCUMENTS

| | | | | |
|---|---|---|---|---|
| 6,423,447 | B1 * | 7/2002 | Ohsaki .................. | H01M 4/131 429/217 |
| 2015/0263333 | A1 * | 9/2015 | Kinugawa ............. | H01M 4/139 429/217 |

FOREIGN PATENT DOCUMENTS

WO   2014/068904 A1   5/2014

* cited by examiner

*Primary Examiner* — Muhammad S Siddiquee
(74) *Attorney, Agent, or Firm* — Westerman, Hattori, Daniels & Adrian, LLP (57) ABSTRACT

A nonaqueous electrolyte secondary battery includes a first electrode plate including a core plate and an active material layer including an active material and a binder, and disposed on a surface of the core plate; a second electrode plate; and a nonaqueous electrolyte. When the surface of the active material layer in contact with the core plate is taken as zero point, the amount of the binder in a 0%-10% thickness region X is 8.5 to 9.5 mass % of the total amount of the binder in the active material layer, the amount of the binder in a 90%-100% thickness region Y is 9.5 to 11.5 mass % of the total amount of the binder in the active material layer, and a binder-richest portion across the thickness of the active material layer resides in a 55%-100% thickness region across the thickness of the active material layer.

4 Claims, 5 Drawing Sheets

NONAQUEOUS ELECTROLYTE SECONDARY BATTERIES AND METHODS FOR PRODUCING THE SAME

CROSS REFERENCE TO RELATED APPLICATIONS

The present invention application claims priority to Japanese Patent Application No. 2018-047969 filed in the Japan Patent Office on Mar. 15, 2018, the entire contents of which are incorporated herein by reference.

BACKGROUND OF THE INVENTION

Field of the Invention

The present invention relates to nonaqueous electrolyte secondary batteries and methods for producing the same.

Description of Related Art

Nonaqueous electrolyte secondary batteries are used in, among others, hybrid electric vehicles, electric vehicles and large-scale electricity storage systems. A nonaqueous electrolyte secondary battery includes a positive electrode plate and a negative electrode plate which are composed of a metal core plate coated with an active material layer including an active material and a binder.

WO 2014/068904 (Patent Document 1) discloses a technique in which the content of a binder contained in an active material layer in a positive electrode or negative electrode plate is varied in the direction of thickness of the active material layer.

An object of the present invention is to provide nonaqueous electrolyte secondary batteries having superior low-temperature output characteristics and high-temperature cycle characteristics.

BRIEF SUMMARY OF THE INVENTION

A nonaqueous electrolyte secondary battery according to an aspect of the present invention includes:

a first electrode plate including a core plate and an active material layer disposed on a surface of the core plate, the active material layer including an active material and a binder, a second electrode plate, and
a nonaqueous electrolyte, the active material layer being such that when the surface of the active material layer in contact with the core plate is taken as zero point, the amount of the binder present in a 0%-10% thickness region across the thickness of the active material layer is 8.5 mass % to 9.5 mass % of the total amount of the binder contained in the active material layer, the amount of the binder present in a 90%-100% thickness region across the thickness of the active material layer is 9.5 mass % to 11.5 mass % of the total amount of the binder contained in the active material layer, and a binder-richest portion having the largest proportion of the binder across the thickness of the active material layer resides in a 55%-100% thickness region across the thickness of the active material layer.

In the nonaqueous electrolyte secondary battery according to one aspect of the present invention, the amount of the binder present in a 0%-10% thickness region across the thickness, namely, in the direction of thickness of the active material layer is controlled to the specific range so as to ensure that the active material layer will be strongly bonded to the core plate and will be reliably prevented from separating from the core plate. Further, this configuration prevents an increase in resistance between the active material layer and the core plate.

In the nonaqueous electrolyte secondary battery according to one aspect of the present invention, the amount of the binder present in a 90%-100% thickness region across the thickness of the active material layer is controlled to the specific range so as to effectively ensure that when the active material layer is compressed, the components constituting the active material layer will not adhere to the compression device such as a compression roller. Thus, the quality of the electrode plate is enhanced. Further, the above configuration ensures that the intercalation and deintercalation of lithium ions into and from the active material will be effectively prevented from being disturbed by the binder that does not contribute directly to charging and discharging. Consequently, the nonaqueous electrolyte secondary battery attains enhanced low-temperature output characteristics.

In the nonaqueous electrolyte secondary battery according to one aspect of the present invention, the binder in the active material layer is most concentrated across the thickness of the active material layer at the specific location so as to ensure that the nonaqueous electrolyte will be held in a favorable state in the active material layer. Consequently, a higher quality film is formed on the surface of the active material, and the nonaqueous electrolyte secondary battery attains excellent high-temperature cycle characteristics.

Another aspect of the present invention resides in a method for producing a nonaqueous electrolyte secondary battery, the nonaqueous electrolyte secondary battery including:

a first electrode plate including a core plate and an active material layer disposed on a surface of the core plate, the active material layer including an active material and a binder, a second electrode plate, and
a nonaqueous electrolyte, the method including:

a slurry preparation step of preparing an active material layer slurry including the active material and the binder, an application step of applying the active material layer slurry to the surface of the core plate, an active material layer formation step of drying the active material layer slurry to form the active material layer on the core plate, and a compression step of compressing the active material layer, the active material layer after the compression step being such that when the surface of the active material layer in contact with the core plate is taken as zero point, the amount of the binder present in a 0%40% thickness region across the thickness of the active material layer is 8.5 mass % to 9.5 mass % of the total amount of the binder contained in the active material layer, the amount of the binder present in a 90%-100% thickness region across the thickness of the active material layer is 9.5 mass % to 11.5 mass % of the total amount of the binder contained in the active material layer, and a binder-richest portion having the largest proportion of the binder across the thickness of the active material layer resides in a 55%-100% thickness region across the thickness of the active material layer.

In the method for producing a nonaqueous electrolyte secondary battery according to one aspect of the present invention, the amount of the binder present in a 0%-10% thickness region across the thickness of the active material layer is controlled to the specific range so as to ensure that the active material layer will be strongly bonded to the core plate and will be reliably prevented from separating from the core plate. Further, this configuration prevents an increase in resistance between the active material layer and the core plate.

In the method for producing a nonaqueous electrolyte secondary battery according to one aspect of the present invention, the amount of the binder present in a 90%-100% thickness region across the thickness of the active material layer is controlled to the specific range so as to effectively ensure that when the active material layer is compressed, the components constituting the active material layer will not adhere to the compression device such as a compression roller. Thus, the quality of the electrode plate is enhanced. Further, the above configuration ensures that the intercalation and deintercalation of lithium ions into and from the active material will be effectively prevented from being disturbed by the binder that does not contribute directly to charging and discharging. Consequently, the nonaqueous electrolyte secondary battery that is obtained attains enhanced low-temperature output characteristics.

In the method for producing a nonaqueous electrolyte secondary battery according to one aspect of the present invention, the binder in the active material layer is most concentrated across the thickness of the active material layer at the specific location so as to ensure that the nonaqueous electrolyte will be held in a favorable state in the active material layer. Consequently, a higher quality film is formed on the surface of the active material, and the nonaqueous electrolyte secondary battery that is obtained attains excellent high-temperature cycle characteristics.

According to the present invention, nonaqueous electrolyte secondary batteries having superior low-temperature output characteristics and high-temperature cycle characteristics can be provided.

DETAILED DESCRIPTION OF THE INVENTION

Hereinbelow, embodiments of the present invention will be described without limiting the scope of the present invention thereto. First, configurations of a nonaqueous electrolyte secondary battery 100 according to an embodiment of the invention will be described with reference to FIGS. 1 and 2.

Figure 1:
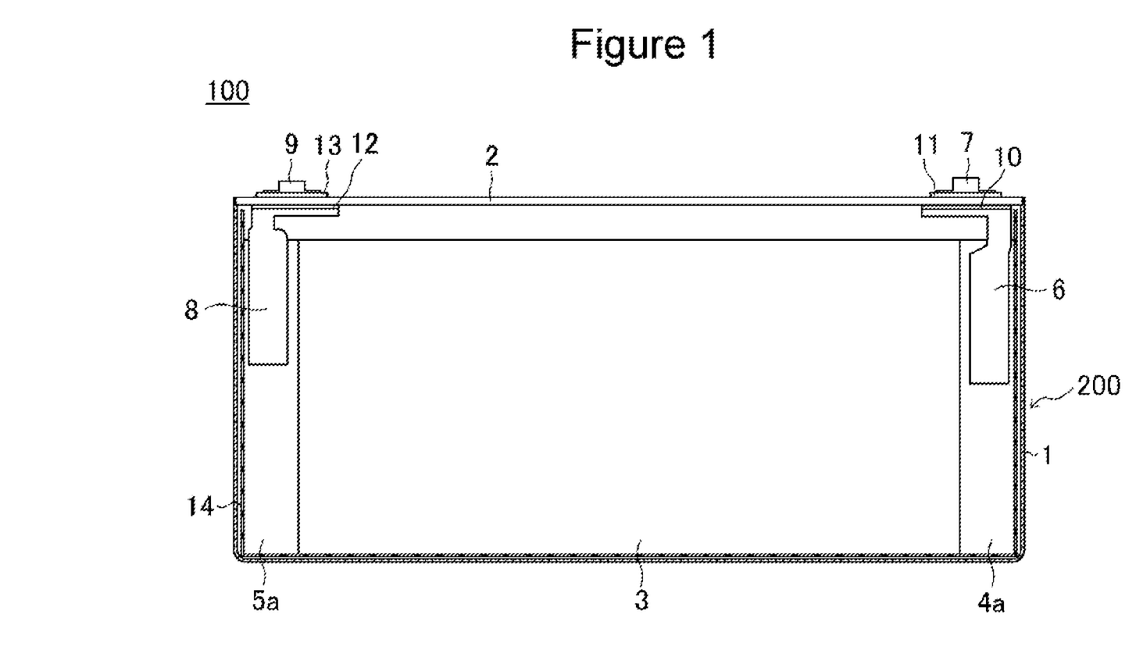
FIG. 1 is a front view illustrating the inside of a nonaqueous electrolyte secondary battery according to an embodiment after removal of a front portion of a battery case and a front portion of an insulating sheet from the battery.
Figure 2:
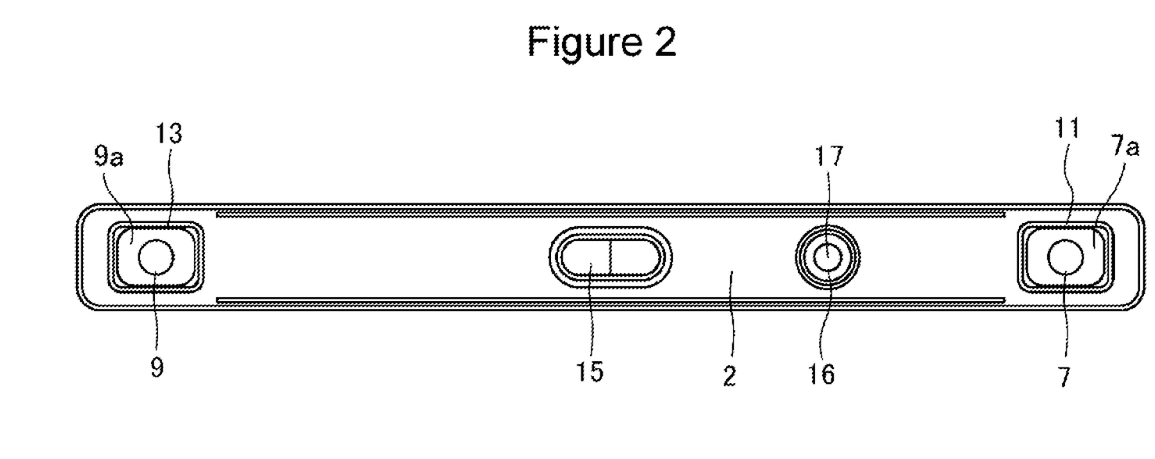
FIG. 2 is a top view illustrating a nonaqueous electrolyte secondary battery according to an embodiment.

As illustrated in FIGS. 1 and 2, the nonaqueous electrolyte secondary battery 100 includes a prismatic exterior case 1 having an open top, and a sealing plate 2 that seals the opening. The prismatic exterior case 1 and the sealing plate 2 constitute a battery case 200. The prismatic exterior case 1 and the sealing plate 2 are each made of metal, preferably aluminum or aluminum alloy. The prismatic exterior case 1 accommodates a flat wound electrode assembly 3 and a nonaqueous electrolyte. The wound electrode assembly 3 includes a positive electrode plate 4 (not shown) and a negative electrode plate 5 (not shown) which are wound via a separator (not shown). The positive electrode plate 4 includes a positive electrode core plate 4a made of metal, and a positive electrode active material layer 4b which includes a positive electrode active material and is disposed on the core plate 4a. In the positive electrode plate 4, a portion of the positive electrode core plate 4a is exposed along the longitudinal direction. The negative electrode plate 5 includes a negative electrode core plate 5a made of metal, and a negative electrode active material layer 5b which includes a negative electrode active material and is disposed on the core plate 5a. In the negative electrode plate 5, a portion of the negative electrode core plate 5a is exposed along the longitudinal direction. The positive electrode core plate 4a is preferably made of aluminum or aluminum alloy, and the negative electrode core plate 5a is preferably made of copper or copper alloy.

In the wound electrode assembly 3, the positive electrode core plate 4a exposed from the positive electrode active material layer 4b is arranged on one end of the wound electrode assembly 3 along the direction in which the roll axis extends. The positive electrode core plate 4a that is exposed forms a stack as a result of the electrode being wound. A positive electrode current collector 6 is connected to the stack of the positive electrode core plate 4a. The positive electrode current collector 6 is preferably made of aluminum or aluminum alloy.

In the wound electrode assembly 3, the negative electrode core plate 5a exposed from the negative electrode active material layer 5b is arranged on the other end of the wound electrode assembly 3 along the direction in which the roll axis extends. The negative electrode core plate 5a that is exposed forms a stack as a result of the electrode being wound. A negative electrode current collector 8 is connected to the stack of the negative electrode core plate 5a. The negative electrode current collector 8 is preferably made of copper or copper alloy.

A positive electrode terminal 7 has a flange portion 7a disposed on the sealing plate 2 outside the battery, and an insertion portion disposed inside through a through-hole in the sealing plate 2. A negative electrode terminal 9 has a flange portion 9a disposed on the sealing plate 2 outside the battery, and an insertion portion disposed inside through a through-hole in the sealing plate 2.

The positive electrode terminal 7 and the positive electrode current collector 6 are fixed to the sealing plate 2 via an outer insulating member 11 and an inner insulating member 10, respectively. The negative electrode terminal 9 and the negative electrode current collector 8 are fixed to the sealing plate 2 via an outer insulating member 13 and an inner insulating member 12, respectively. The inner insulating member 10 is disposed between the sealing plate 2 and the positive electrode current collector 6, and the outer insulating member 11 is disposed between the sealing plate 2 and the positive electrode terminal 7. The inner insulating member 12 is disposed between the sealing plate 2 and the negative electrode current collector 8, and the outer insulating member 13 is disposed between the sealing plate 2 and the negative electrode terminal 9. The wound electrode assembly 3 is accommodated in the prismatic exterior case 1 while being covered with an insulating sheet 14. The sealing plate 2 is welded and connected to the rim of the open end of the prismatic exterior case 1 by welding such as laser welding. The sealing plate 2 has an electrolyte inlet 16, which is closed with a sealing plug 17 after the nonaqueous electrolyte is poured into the battery case 200. The sealing plate 2 has a gas vent valve 15 through which gas can be discharged in the event where the pressure inside the battery exceeds a predetermined value.

Next, a method for producing a nonaqueous electrolyte secondary battery 100 will be described. [Fabrication of positive electrode plate]

A positive electrode active material layer slurry was prepared by mixing $LiNi_{0.35}Co_{0.35}Mn_{0.30}O_2$ as a positive electrode active material, carbon black as a conductive agent, polyvinylidene fluoride (PVdF) as a binder, and N-methyl-2-pyrrolidone (NMP) as a dispersion medium. Here, the mass ratio of positive electrode active material: conductive agent:binder was 91:6:3. The positive electrode active material layer slurry was applied to a side of an aluminum alloy foil (15 μm thick) as a positive electrode core plate, and was dried by removing NMP used as the solvent in the preparation of the positive electrode active material layer slurry. A positive electrode active material layer was thus formed. In the same manner, a positive electrode active material layer was formed on the other side of the aluminum alloy foil. Thereafter, the coated plate was compressed with a compression roller until the positive electrode active material layers 4b attained the predetermined packing density (2.61 g/cm$^3$), and was cut into the predetermined size. A positive electrode plate 4 was thus fabricated.

Figure 3A:
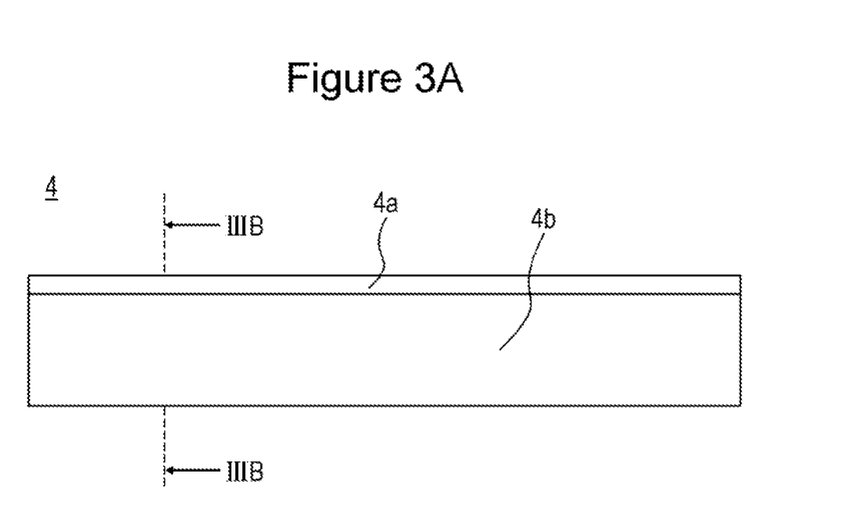
FIG. 3A is a plan view of a positive electrode plate according to an embodiment.
Figure 3B:
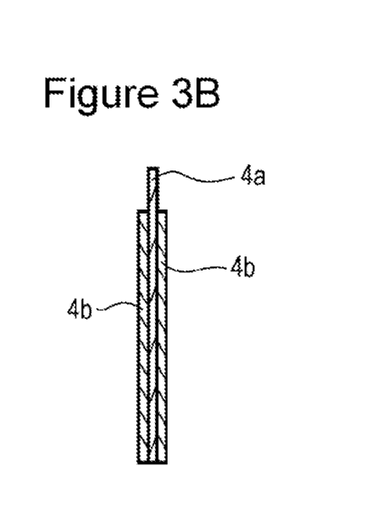
FIG. 3B is a sectional view of the positive electrode plate along line IIIB-IIIB in FIG. 3A.

As illustrated in FIG. 3, the positive electrode active material layers 4b are disposed on both sides of the positive electrode core plate 4a. The positive electrode plate 4 is in the form of a strip. Along an end of the positive electrode plate 4 in the width direction, the positive electrode core plate 4a is exposed as a result of there being no positive electrode active material layers 4b on both sides.
[Fabrication of Negative Electrode Plate]
[Negative Electrode Active Material Layer Slurry A]

A negative electrode active material layer slurry A was prepared by mixing graphite particles as a negative electrode active material, carboxymethylcellulose (CMC) as a thickener, styrene butadiene rubber (SBR) as a binder, and water as a dispersion medium. Here, the mass ratio of negative electrode active material (graphite particles):thickener (CMC):binder (SBR):dispersion medium (water) was 47.5-48.3:0.7:1.0-1.8:50.
[Negative Electrode Active Material Layer Slurry B]

A negative electrode active material layer slurry B was prepared by mixing graphite particles as a negative electrode active material, carboxymethylcellulose (CMC) as a thickener, styrene butadiene rubber (SBR) as a binder, and water as a dispersion medium. Here, the mass ratio of negative electrode active material (graphite particles):thickener (CMC):binder (SBR):dispersion medium (water) was 48.3-99.1:0.7:0.2-1.0:50.

The negative electrode active material layer slurry A was applied to a side of a copper foil (10 μm thick) as a negative electrode core plate 5a, and the negative electrode active material layer slurry B was applied over the negative electrode active material layer slurry A. The thicknesses in which the negative electrode active material layer slurry A and the negative electrode active material layer slurry B were applied were the same. Thereafter, the negative electrode active material layer slurry A and the negative electrode active material layer slurry B were dried by removing water used as the dispersion medium. Consequently, a negative electrode active material layer 5b was formed on the negative electrode core plate 5a. In the same manner, a negative electrode active material layer 5b was formed on the other side of the negative electrode core plate 5a (10 μm thick copper foil). Here, the thickness of the negative electrode active material layer 5b on either side of the negative electrode core plate 5a was 100 μm before compression.

After the negative electrode active material layers 5b had been formed on both sides of the negative electrode core plate 5a, the negative electrode plate was passed through a pair of compression rollers so as to compress the negative electrode active material layers 5b to the predetermined thickness. The compressed negative electrode plate was cut into the predetermined size. A negative electrode plate 5 of Example 1 was thus obtained. Here, the thickness of the negative electrode active material layer 5b on either side of the negative electrode core plate 5a after compression was 68 μm.

Figure 4A:
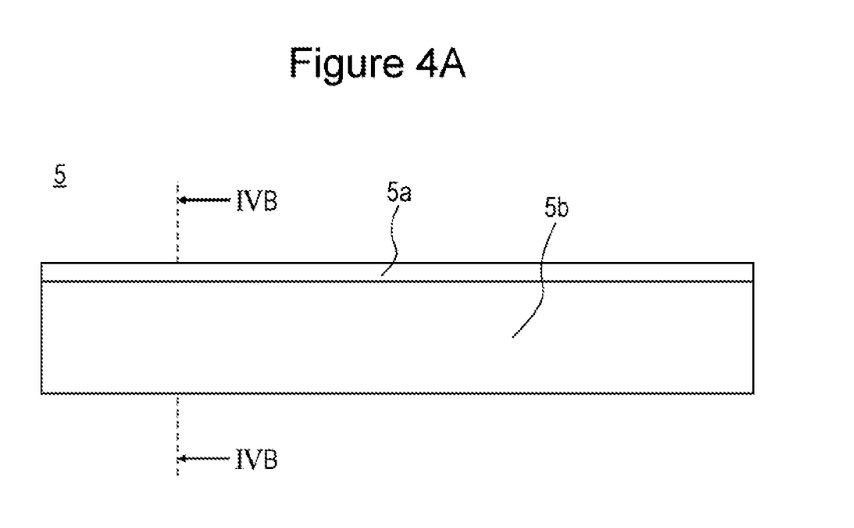
FIG. 4A is a plan view of a negative electrode plate according to an embodiment.
Figure 4B:
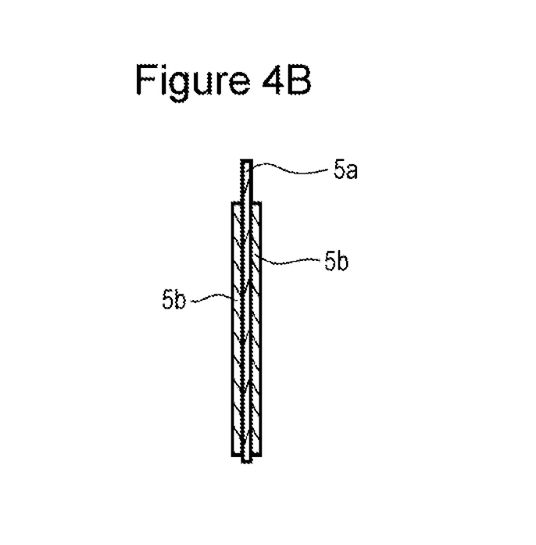
FIG. 4B is a sectional view of the negative electrode plate along line IVB-IVB in FIG. 4A.

As illustrated in FIG. 4, the negative electrode active material layers 5b are disposed on both sides of the negative electrode core plate 5a. The negative electrode plate 5 is in the form of a strip. Along an end of the negative electrode plate 5 in the width direction, the negative electrode core plate 5a is exposed as a result of there being no negative electrode active material layers 5b on both sides.

Figure 5:
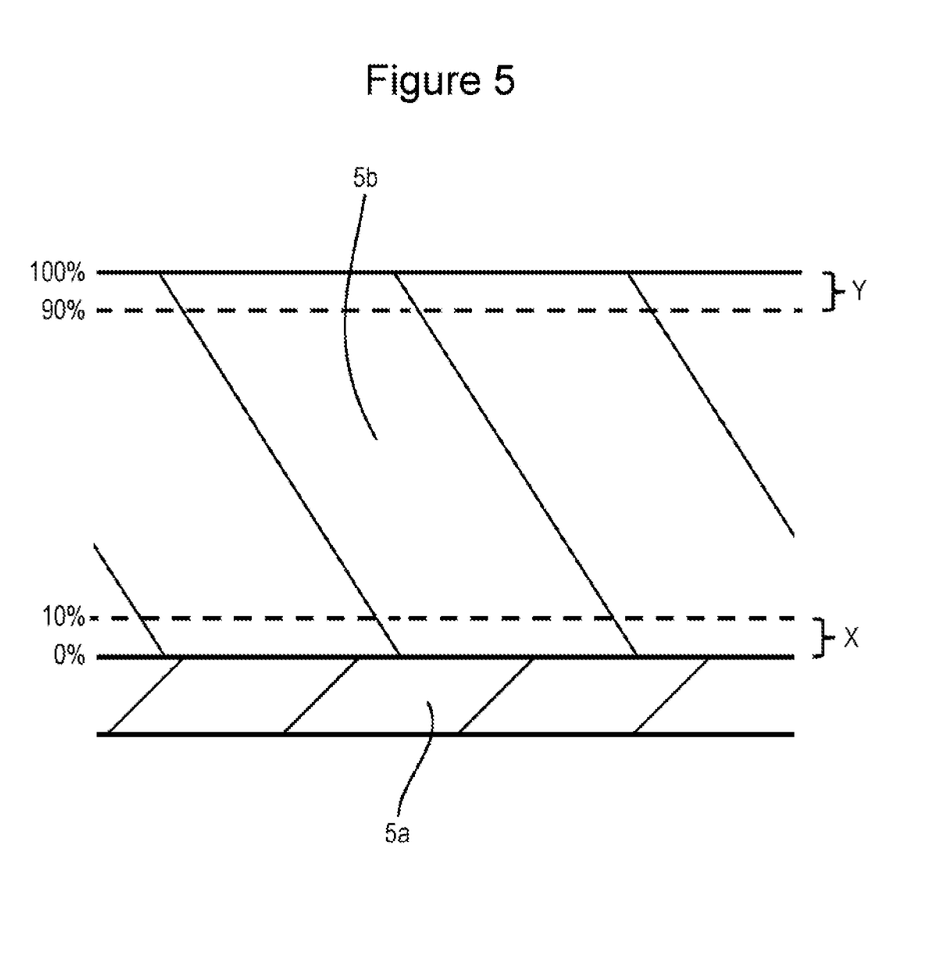
FIG. 5 is a sectional view illustrating a negative electrode core plate and a negative electrode active material layer disposed on one side of the negative electrode core plate.

As illustrated in FIG. 5, when the surface of the negative electrode active material layer 5b in contact with the negative electrode core plate 5a is taken as zero point, the region X extends from 0% thickness to 10% thickness of the negative electrode active material layer 5b in the direction of thickness of the negative electrode active material layer 5b. This region will be written as the 0%-10% thickness region X. Similarly, when the surface of the negative electrode active material layer 5b in contact with the negative electrode core plate 5a is taken as zero point, the region Y extends from 90% thickness to 100% thickness of the negative electrode active material layer 5b in the direction of thickness of the negative electrode active material layer 5b. This region will be written as the 90%-100% thickness region Y.

In the negative electrode plate 5 of Example 1, the amount of SBR contained in the 0%-10% thickness region X of the negative electrode active material layer 5b is 9.0 mass % of the total amount of SBR contained in the negative electrode active material layer 5b, the amount of SBR contained in the 90%-100% thickness region Y of the negative electrode active material layer 5b is 10.5 mass % of the total amount of SBR contained in the negative electrode active material layer 5b, and the SBR-richest portion having the largest proportion of SBR across the thickness of the negative electrode active material layer 5b resides in a location corresponding to 60% thickness of the negative electrode active material layer 5b.

The binder-richest portion of the negative electrode active material layer 5b which has the largest proportion of the binder across the thickness of the negative electrode active material layer 5b may be identified by examining the distribution (of the contents) of the binder in the direction of thickness of the negative electrode active material layer 5b. The binder-richest portion of the positive electrode active material layer 4b across the thickness of the positive electrode active material layer 4b may be identified in the same manner. When the binder in the negative electrode active material layer 5b is SBR, the distribution of SBR in the direction of thickness of the negative electrode active material layer 5b may be determined by, for example, staining SBR on a cross section of the negative electrode active material layer 5b with bromine, and analyzing an image of the cross section to draw a SBR distribution curve. The content at the peak top of the distribution curve is then obtained as the amount of the binder in the binder-richest portion of the negative electrode active material layer 5b across the thickness of the negative electrode active material layer 5b.

The positive electrode plate 4 and the negative electrode plate 5 obtained as described above are wound via a polyethylene porous separator therebetween. The electrode coil is then pressed into a flattened form. A flat wound electrode assembly 3 is thus obtained which shows a coil of the positive electrode core plate 4a on one end and a coil of the negative electrode core plate 5a on the other end.

[Attachment of Parts to Sealing Plate]

Next, the manners in which a positive electrode current collector 6, a positive electrode terminal 7, a negative electrode current collector 8 and a negative electrode terminal 9 are attached to a sealing plate 2 will be explained taking the attachment of the positive electrode parts as an example. The parts for the negative electrode can be attached in the similar manner.

An outer insulating member 11 is arranged to the sealing plate 2 outside the battery, and an inner insulating member 10 and a positive electrode current collector 6 are arranged to the sealing plate 2 inside the battery. An insertion portion of a positive electrode terminal 7 is inserted from the outside of the battery into through-holes disposed in the outer insulating member 11, the sealing plate 2, the inner insulating member 10 and the positive electrode current collector 6. The front end portion of the insertion portion of the positive electrode terminal 7 is then crimped. Consequently, the positive electrode terminal 7, the outer insulating member 11, the sealing plate 2, the inner insulating member 10 and the positive electrode current collector 6 are fixed together. Preferably, the crimped front end portion of the insertion portion of the positive electrode terminal 7 is welded to the positive electrode current collector 6.

[Attachment of Current Collectors to Electrode Assembly]

By resistance welding, the positive electrode current collector 6 is connected to the stack of the positive electrode core plate 4a. By resistance welding, the negative electrode current collector 8 is connected to the stack of the negative electrode core plate 5a. The welding may be ultrasonic welding or laser welding.

[Preparation of Nonaqueous Electrolyte]

A mixed solvent was prepared by mixing ethylene carbonate (EC), ethyl methyl carbonate (EMC) and diethyl carbonate (DEC) in a volume ratio (25° C., 1 atm) of 3:3:4. To the mixed solvent, $LiPF_6$ was added in a concentration of 1 mol/L. Further, vinylene carbonate (VC) was added in an amount of 0.3 mass % relative to the mass of the nonaqueous electrolyte. A nonaqueous electrolytic solution was thus prepared.

The wound electrode assembly 3 placed in a box of an insulating sheet 14 was inserted into a prismatic exterior case 1. The sealing plate 2 was welded and connected to the rim of the open end of the prismatic exterior case 1 by welding such as laser welding. Thereafter, the nonaqueous electrolyte was poured into the battery case 200 through an electrolyte inlet 16 of the sealing plate 2, and the electrolyte inlet 16 was closed with a sealing plug 17. Consequently, a nonaqueous electrolyte secondary battery 100 of Example 1 was fabricated.

Examples 2 to 4 and Comparative Examples 1 to 4

Nonaqueous electrolyte secondary batteries of Examples 2 to 4 and Comparative Examples 1 to 4 differ from the nonaqueous electrolyte secondary battery 100 of Example 1 only in the distribution of binder (SBR) concentration in the negative electrode active material layers 5b of the negative electrode plate 5.

Regarding the negative electrode plates 5 used in the nonaqueous electrolyte secondary batteries of Examples 2 to 4 and Comparative Examples 1 to 4, Table 1 describes the proportion of the amount of SBR contained in the 0%-10% thickness region X of the negative electrode active material layer 5b relative to the total amount of SBR contained in the negative electrode active material layer 5b, the proportion of the amount of SBR contained in the 90%-100% thickness region Y of the negative electrode active material layer 5b relative to the total amount of SBR contained in the negative electrode active material layer 5b, and the location of the SBR-richest portion in the negative electrode active material layer 5b across the thickness of the negative electrode active material layer 5b.

In the negative electrode plates 5 used in the nonaqueous electrolyte secondary batteries of Examples 1 to 4 and Comparative Examples 1 to 4, SBR was distributed in various concentrations in the negative electrode active material layer 5b in the following manners. In Examples and Comparative Examples, the negative electrode active material layer slurries A and B were prepared while making sure that the amounts of SBR contained in the slurries A and B were different among Examples and Comparative Examples but the total amounts of SBR contained in the slurries A and B were identical in Examples and Comparative Examples. Further, the rate at which the negative electrode active material layer slurry A and the negative electrode active material layer slurry B were dried (the rate at which water was evaporated) was controlled. In these manners, the distribution of SBR concentration in the negative electrode active material layer 5b was caused to vary among Examples and Comparative Examples.

When the amount of SBR is larger in the negative electrode active material layer slurry A that is applied on the negative electrode core plate 5a, SBR tends to be richer in a region of the negative electrode active material layer 5b near the negative electrode core plate 5a. When the amount of SBR is larger in the negative electrode active material layer slurry B that is applied over the negative electrode active material layer slurry A, SBR tends to be richer in a region near the top surface of the negative electrode active material layer 5b.

Further, the amount of SBR contained in a region near the top surface of the negative electrode active material layer 5b tends to be increased with increasing drying rate.

[Adhesion Between Negative Electrode Core Plate and Negative Electrode Active Material Layer]

The negative electrode plates 5 used in the nonaqueous electrolyte secondary batteries of Examples 1 to 4 and Comparative Examples 1 to 4 were tested by the following method to measure the adhesion between the negative electrode core plate 5a and the negative electrode active material layer 5b.

A tape (NITTO 5015) was provided in which pressure-sensitive adhesive layers were disposed on both sides of a resin substrate. One of the pressure-sensitive adhesive layers was applied to a resin plate, and the negative electrode active material layer 5b of the negative electrode plate 5 was attached to the pressure-sensitive adhesive layer on the other side of the tape. Thereafter, the negative electrode plate 5 was pulled at a constant speed, and the load which caused a separation of the negative electrode active material layer 5b from the negative electrode core plate 5a was measured with a load cell. The bond strength was thus obtained.

Table 1 describes the results of measurement of the adhesion between the negative electrode core plate 5a and the negative electrode active material layer 5b in the negative electrode plates 5 used in the nonaqueous electrolyte secondary batteries of Examples 1 to 4 and Comparative Examples 1 to 4. In Table 1, the bond strengths between the negative electrode core plate 5a and the negative electrode active material layer 5b in the negative electrode plates 5 are expressed in values relative to the bond strength, taken as 100, between the negative electrode core plate 5a and the negative electrode active material layer 5b in the negative electrode plate 5 used in the nonaqueous electrolyte secondary battery of Example 3.

[Low-Temperature Output Characteristics (I-V Resistance at Low Temperature)]

The nonaqueous electrolyte secondary batteries of Examples 1 to 4 and Comparative Examples 1 to 4 were tested in the following manner to measure the low-temperature I-V resistance as an indicator of low-temperature output characteristics. At 25° C., the nonaqueous electrolyte secondary battery was charged to 50% state of charge (SOC). Next, at −30° C., the nonaqueous electrolyte secondary battery was discharged at 60 A, 120 A, 180 A and 240 A each for 10 seconds, and the battery voltages were measured. The current values and the battery voltages were plotted, and the I-V resistance during discharging was calculated from the slope of the curve. The SOC after discharging was returned to the original by charging the battery at a constant current of 5 A.

Table 1 describes the results of measurement of the low-temperature I-V resistance of the nonaqueous electrolyte secondary batteries of Examples 1 to 4 and Comparative Examples 1 to 4. In Table 1, the I-V resistances of the nonaqueous electrolyte secondary batteries are expressed in values relative to the I-V resistance of the nonaqueous electrolyte secondary battery of Example 4 taken as 100. The lower the I-V resistance, the more excellent the low-temperature output characteristics.

[High-Temperature Cycle Characteristics]

The nonaqueous electrolyte secondary batteries of Examples 1 to 4 and Comparative Examples 1 to 4 were tested by the following method to evaluate high-temperature cycle characteristics.

(High-Temperature Cycle Test)

Charging conditions: constant current 1.0 C (37.0 A), constant voltage 4.3 V, cut-off current 50 mA, 60° C.

Discharging conditions: constant current 1.0 C (37.0 A), cut-off voltage 2.5 V, 60° C.

Capacity retention (%) after cycles at high temperature: (Discharge capacity in 1000th cycle/Discharge capacity in 1st cycle)×100

Table 1 describes the results of the high-temperature cycle test of the nonaqueous electrolyte secondary batteries of Examples 1 to 4 and Comparative Examples 1 to 4. In Table 1, the capacity retentions after cycles at high temperature as an indicator of high-temperature cycle characteristics are expressed in values relative to the capacity retention of the nonaqueous electrolyte secondary battery of Example 1 taken as 100.

[Evaluation of Fouling of Compression Rollers]

The negative electrode plates 5 used in the nonaqueous electrolyte secondary batteries of Examples 1 to 4 and Comparative Examples 1 to 4 were evaluated as described below to determine the amount of the components of the negative electrode active material layer 5b which adhered to compression rollers during the compression of the negative electrode active material layer 5b through the compression rollers. The negative electrode plate before compression was compressed over 1000 m. With use of a handy gloss meter (PG-II manufactured by NIPPON DENSHOKU INDUSTRIES CO., LTD.), the surface gloss of the compression rollers before and after the compression treatment was measured at a single angle of 60°. The gloss value of the compression rollers before the compression treatment was compared with the gloss value of the compression rollers after the compression treatment. The gloss value of the compression rollers is reduced with increasing amount of the components of the negative electrode active material layer 5b adhering to the compression rollers. Thus, a larger excess in gloss value before the compression treatment over the gloss value after the compression treatment indicates that a larger amount of the components of the negative electrode active material layer 5b has adhered to the compression rollers.

Table 1 describes the results of the evaluation of fouling of compression rollers during the compression of the negative electrode plates 5 used in the nonaqueous electrolyte secondary batteries of Examples 1 to 4 and Comparative Examples 1 to 4. In Table 1, the reference gloss value (100) is that of the compression rollers before the compression treatment in comparison with the gloss value of the compression rollers after the compression treatment of the negative electrode plate 5 used in the nonaqueous electrolyte secondary battery of Example 1, and the differences of the gloss values of the compression rollers before the compression treatment from those of the compression rollers after the compression treatment of the rest of the negative electrode plates 5 are expressed in values relative to the reference gloss value taken as 100.

TABLE 1

| | Proportion (mass %) of amount of SBR in 0%-10% thickness region | Proportion (mass %) of amount of SBR in 90%-100% thickness region | Location of SBR-richest portion | Adhesion | Low-temperature I-V resistance | High-temperature cycle characteristics | Fouling of compression rollers |
|---|---|---|---|---|---|---|---|
| Comp. Ex. 1 | 7.0 | 13.7 | 100% Thickness of negative electrode active material layer | 80 | 105 | 100 | 100 |
| Comp. Ex. 2 | 7.5 | 13.0 | 100% Thickness of negative electrode active material layer | 85 | 105 | 100 | 100 |

TABLE 1-continued

|  | Proportion (mass %) of amount of SBR in 0%-10% thickness region | Proportion (mass %) of amount of SBR in 90%-100% thickness region | Location of SBR-richest portion | Adhesion | Low-temperature I-V resistance | High-temperature cycle characteristics | Fouling of compression rollers |
|---|---|---|---|---|---|---|---|
| Comp. Ex. 3 | 10.5 | 8.1 | 45% Thickness of negative electrode active material layer | 120 | 91 | 95 | 115 |
| Comp. Ex. 4 | 9.5 | 11.0 | 40% Thickness of negative electrode active material layer | 115 | 95 | 97 | 100 |
| Ex. 1 | 9.0 | 10.5 | 60% Thickness of negative electrode active material layer | 110 | 96 | 100 | 100 |
| Ex. 2 | 9.5 | 9.5 | 80% Thickness of negative electrode active material layer | 115 | 93 | 100 | 100 |
| Ex. 3 | 8.5 | 11.0 | 100% Thickness of negative electrode active material layer | 100 | 98 | 100 | 100 |
| Ex. 4 | 8.5 | 11.5 | 100% Thickness of negative electrode active material layer | 100 | 100 | 100 | 100 |

In the nonaqueous electrolyte secondary batteries of Examples 1 to 4, the amount of SBR contained in the 0%-10% thickness region X of the negative electrode active material layer 5b is 8.5 mass % to 9.5 mass % relative to the total amount of SBR contained in the negative electrode active material layer 5b. By virtue of this, the negative electrode active material layer 5b exhibits high bond strength with respect to the negative electrode core plate 5a and is more resistant to separation from the negative electrode core plate 5a. Further, the increase in resistance of the negative electrode plate 5 is effectively reduced.

In the nonaqueous electrolyte secondary batteries of Examples 1 to 4, the amount of SBR contained in the 90%-100% thickness region Y of the negative electrode active material layer 5b is 9.5 mass % to 11.5 mass % relative to the total amount of SBR contained in the negative electrode active material layer 5b. By virtue of this, the negative electrode active material layer 5b is compressed while the components of the negative electrode active material layer 5b are effectively prevented from adhering to the compression device such as compression rollers, and the negative electrode plate 5 attains higher quality. Further, the intercalation and deintercalation of lithium ions into and from the negative electrode active material is effectively prevented from being disturbed by SBR that does not contribute directly to charging and discharging. Consequently, the nonaqueous electrolyte secondary batteries attain small low-temperature I-V resistance and superior low-temperature output characteristics.

In the nonaqueous electrolyte secondary batteries of Examples 1 to 4, the SBR-richest portion across the thickness of the negative electrode active material layer 5b is located in the 55%-100% thickness region across the thickness of the negative electrode active material layer 5b. By virtue of this, the nonaqueous electrolyte can be sufficiently held on the surface side of the negative electrode active material layer 5b and a more uniform film can be formed on the surface of the negative electrode active material existing near the surface of the negative electrode active material layer 5b. Consequently, the nonaqueous electrolyte secondary batteries attain excellent high-temperature cycle characteristics. Further, the negative electrode active material layer 5b can be effectively prevented from coming off during cutting of the negative electrode plate 5.

In the nonaqueous electrolyte secondary batteries of Comparative Examples 1 and 2, the amount of SBR contained in the 0%-10% thickness region X of the negative electrode active material layer 5b is as low as 7.0 mass % to 7.5 mass % relative to the total amount of SBR contained in the negative electrode active material layer 5b. As a result of this, the bond strength between the negative electrode core plate 5a and the negative electrode active material layer 5b is decreased to give rise to a risk that the negative electrode active material layer 5b separates from the negative electrode core plate 5a and the battery capacity is lowered. Further, the resistance of the negative electrode plate 5 tends to be increased, and the low-temperature output characteristics will be lowered.

In the nonaqueous electrolyte secondary battery of Comparative Example 3, the amount of SBR contained in the 90%-100% thickness region Y of the negative electrode active material layer 5b is as low as 8.1 mass % relative to the total amount of SBR contained in the negative electrode active material layer 5b. As a result of this, compressing of the negative electrode active material layer 5b tends to be accompanied by a fouling of the compression device such as compression rollers with the components of the negative electrode active material layer 5b, possibly deteriorating the quality of the negative electrode plate 5. Further, in the nonaqueous electrolyte secondary battery of Comparative Example 3, the binder-richest portion across the thickness of the negative electrode active material layer 5b is located at 45% thickness of the negative electrode active material layer 5b. As a result of this, less nonaqueous electrolyte will be held on the surface side of the negative electrode active material layer 5b and the film formed on the surface of the negative electrode active material will be unequalized, resulting in a decrease in high-temperature cycle characteristics.

In the nonaqueous electrolyte secondary battery of Comparative Example 4, the binder-richest portion across the thickness of the negative electrode active material layer 5b is located at 40% thickness of the negative electrode active material layer 5b. As a result of this, less nonaqueous electrolyte will be held on the surface side of the negative electrode active material layer 5b and the film formed on the surface of the negative electrode active material will be unequalized, resulting in a decrease in high-temperature cycle characteristics.

As demonstrated above, the nonaqueous electrolyte secondary batteries provided in accordance with the present invention do not foul compression rollers, do have a quality negative electrode plate, exhibit high adhesion of a negative electrode active material layer with respect to a negative electrode core plate, and attain superior low-temperature output characteristics and high-temperature cycle characteristics.

<<Others>>

The distribution of the binder in the direction of thickness of the active material layer is not substantially changed before and after the compression of the active material layer.

For example, the thickness of the active material layer on one side of the core plate is preferably 10 μm to 120 μm, more preferably 60 μm to 100 μm, and still more preferably 90 μm to 100 μm.

The proportion of the mass of the binder contained in the active material layer is preferably 0.4 mass % to 1.2 mass % relative to the total mass of the active material layer, and is more preferably 0.7 mass % to 1.0 mass %, and still more preferably 0.9 mass % to 1.0 mass %.

In the present invention, a protective layer may be formed on the surface of at least one of the positive electrode plate, the negative electrode plate and the separator. The protective layer is preferably one which includes a binder and ceramic particles such as alumina, zirconia or titania. The protective layer is not included in the active material layer.

In the present invention, the binder contained in the active material layer is preferably styrene butadiene rubber. It is also preferable that carboxymethylcellulose or a salt of carboxymethylcellulose be contained as a thickener in the active material layer. The carboxymethylcellulose or the salt of carboxymethylcellulose is preferably distributed substantially uniformly in the active material layer. The salt of carboxymethylcellulose may be, for example, the sodium salt or the ammonium salt.

The negative electrode active material is preferably a carbon or silicon material capable of adsorbing and releasing lithium ions. A preferred carbon material is carbon particles such as graphite, amorphous carbon, or coated graphite which is graphite coated with amorphous carbon. A mixture of a carbon material and a silicon material may be used.

The positive electrode active material is preferably a lithium transition metal composite oxide. The lithium transition metal composite oxide is preferably one which includes at least one of nickel, cobalt and manganese.

The nonaqueous electrolyte is preferably a nonaqueous electrolytic solution of an electrolyte salt in a nonaqueous solvent. Examples of the nonaqueous solvents include esters, ethers, nitriles such as acetonitrile, amides such as dimethylformamide, and mixtures of two or more of these solvents. The nonaqueous solvent may be substituted with a halogen atom such as fluorine in place of at least part of hydrogen atoms. That is, the nonaqueous solvent may include a halogenated solvent. Examples of such halogenated solvents include fluorinated cyclic carbonate esters such as fluoroethylene carbonate (FEC), fluorinated chain carbonate esters, and fluorinated chain carboxylate esters such as fluoromethyl propionate (FMP).

Examples of the esters include cyclic carbonate esters such as ethylene carbonate (EC), propylene carbonate (PC) and butylene carbonate, chain carbonate esters such as dimethyl carbonate (DMC), methyl ethyl carbonate (MEC), diethyl carbonate (DEC), methyl propyl carbonate, ethyl propyl carbonate and methyl isopropyl carbonate, cyclic carboxylate esters such as γ-butyrolactone (GBL) and γ-valerolactone (GVL), and chain carboxylate esters such as methyl acetate, ethyl acetate, propyl acetate, methyl propionate (MP) and ethyl propionate. In particular, it is preferable to use at least one selected from EC, MEC and DMC.

Examples of the electrolyte salts include $LiPF_6$, $LiBF_4$, $LiClO_4$, $LiPF_2O_2$, $LiAsF_6$, $LiSbF_6$, $LiAlCl_4$, LiSCN, $LiCF_3SO_3$, $LiCF_3CO_2$, $Li(P(C_2O_4)F_4)$, $LiPF_{6-x}(C_nF_{2n+1})_x$ (1<x<6, and n is 1 or 2), and lithium bisoxalatoborate. From points of view such as ion conductivity and electrochemical stability, $LiPF_6$ is preferably used. The concentration of the lithium salt such as $LiPF_6$ is, for example, 0.8 to 1.8 mol per 1 L of the nonaqueous solvent.

While detailed embodiments have been used to illustrate the present invention, to those skilled in the art, however, it will be apparent from the foregoing disclosure that various changes and modifications can be made therein without departing from the spirit and scope of the invention. Furthermore, the foregoing description of the embodiments according to the present invention is provided for illustration only, and is not intended to limit the invention.

What is claimed is:

1. A nonaqueous electrolyte secondary battery comprising:
    a first electrode plate including a core plate and an active material layer disposed on a surface of the core plate, the active material layer including an active material and a binder,
    a second electrode plate, and
    a nonaqueous electrolyte,
    the active material layer being such that when the surface of the active material layer in contact with the core plate is taken as zero point,
        the amount of the binder present in a 0%-10% thickness region across the thickness of the active material layer is 8.5 mass % to 9.5 mass % of the total amount of the binder contained in the active material layer,
        the amount of the binder present in a 90%-100% thickness region across the thickness of the active material layer is 9.5 mass % to 11.5 mass % of the total amount of the binder contained in the active material layer, and
        a binder-richest portion having the largest proportion of the binder across the thickness of the active material layer resides in a 55%-100% thickness region across the thickness of the active material layer.

2. The nonaqueous electrolyte secondary battery according to claim 1, wherein
    the active material is a carbon material, and
    the binder is styrene butadiene rubber and/or a modified product of styrene butadiene rubber.

3. The nonaqueous electrolyte secondary battery according to claim 2, wherein the active material layer includes at least one of carboxymethylcellulose and a salt of carboxymethylcellulose.

4. The nonaqueous electrolyte secondary battery according to claim 1, wherein the binder-richest portion having the largest proportion of the binder across the thickness of the active material layer resides in a 60%-90% thickness region across the thickness of the active material layer.

* * * * *